United States Patent
Bakke et al.

(10) Patent No.: US 6,904,690 B2
(45) Date of Patent: Jun. 14, 2005

(54) PIPE SIZE IDENTIFIER AND MEASURING TOOL

(76) Inventors: John S. Bakke, 1247 Lorelei Ct., Campbell, CA (US) 95008-1716; David C. Bakke, 1247 Lorelei Ct., Campbell, CA (US) 95008-1716

(*) Notice: Subject to any disclaimer, the term of this patent is extended or adjusted under 35 U.S.C. 154(b) by 0 days.

(21) Appl. No.: 10/120,064

(22) Filed: Apr. 10, 2002

(65) Prior Publication Data

US 2002/0162238 A1 Nov. 7, 2002

Related U.S. Application Data

(63) Continuation of application No. 08/835,002, filed on Apr. 7, 1997, now abandoned.

(51) Int. Cl.[7] ................................................. G01B 3/38
(52) U.S. Cl. ...................... 33/501.45; 33/562; 33/1 H
(58) Field of Search ............................... 33/555.2, 562, 33/501.45, 555.1, 529, 1 H, 833, 679.1, 567

(56) References Cited

U.S. PATENT DOCUMENTS

| | | | | |
|---|---|---|---|---|
| 69,953 A | * | 10/1867 | Richards | 33/567 |
| 644,756 A | * | 3/1900 | Bailey | 33/562 |
| 781,960 A | * | 2/1905 | Marbach | 33/562 |
| 987,703 A | * | 3/1911 | Curtin | 33/562 |
| 1,562,332 A | * | 11/1925 | Jaques, Jr. | 33/567 |
| 1,638,885 A | * | 8/1927 | Shea | 33/567 |
| 1,674,834 A | * | 6/1928 | Mitchell | 33/517 |
| 1,825,987 A | * | 10/1931 | Witchger | 33/563 |
| 1,881,651 A | * | 10/1932 | Judge | 33/562 |
| 2,334,422 A | * | 11/1943 | Lehnus | 33/403 |
| 2,362,907 A | * | 11/1944 | Levin | 33/494 |
| 2,560,571 A | * | 7/1951 | Hawkins | 33/833 |
| 4,438,391 A | * | 3/1984 | Rog et al. | 324/71.1 |
| 4,995,168 A | * | 2/1991 | Shiner | 405/163 |
| 5,050,310 A | * | 9/1991 | Jiles | 33/550 |
| 5,450,677 A | * | 9/1995 | Casey | 33/529 |
| 5,875,558 A | * | 3/1999 | Bakke et al. | 33/501.45 |

OTHER PUBLICATIONS

Dec. 1935, GB, Henderson.*

* cited by examiner

Primary Examiner—R. Alexander Smith
(74) Attorney, Agent, or Firm—Howard C. Miskin; Gloria Tsui-Yip

(57) ABSTRACT

A pipe size measuring tool for identifying the pipe configuration, i.e., outer diameter and inner diameter, having a plurality of gauges, each gauge having an open mouth therein. The sizes of the open mouth in each gauge are different from each other. The gauges are mounted together with each gauge having a front end, a body portion and a rear end. The gauges are pivotally mounted together adjacent their rear ends so that they are moveable from a folded compact position to an open position. The front ends are wider than the rear ends and the gauges are thin light-weight. The gauges are of different sizes with the larger open mouths located in the larger gauges with indicia on the gauge which identifies the pipe measured.

1 Claim, 5 Drawing Sheets

PIPE SIZE IDENTIFIER AND MEASURING TOOL

This is a continuation of application Ser. No. 08/835,002, filed on Apr. 7, 1997 now abandoned.

BACKGROUND

The present invention relates to an improved pipe size measuring tool and more particularly to an improved light-weight, manually usable pipe size and identification measuring tool for quickly determining the size and thus identify the type of pipe, especially in a cramped space, such as irrigating piping, already in the ground. The "size" of a pipe measured by the present invention normally differs from the actual or true diameter of that pipe.

Presently, in order to determine the size and type of a pipe, especially installed irrigation pipe, i.e., its diameter and circumference, a piece of string is wrapped around the pipe, measured, and then reference is made to a chart to determine what circumference matches up with what type and size of pipe. Alternatively, a flexible tape measure is wrapped around the pipe to measure it and the same steps when using the string are followed.

Such methods are cumbersome and time consuming. Presently if a pipe is buried or only partially exposed, such as irrigating pipe in the ground, a section must be fully exposed before its size can be determined using existing methods. Also, unless the charts are available in the field, where the pipe is, the true dimensions will not determine the size of the pipe. Furthermore, if a pipe is in an out of the way place, such as inside a building adjacent to a wall, or in a deep ditch or trench, the difficulties of measuring the pipe are magnified enormously. Similar awkward and time consuming methods are currently used to measure and identify the size and type of pipe.

Each industry uses different classes and schedules of pipe and pipe material, including copper tubing. Plumbers may use ABS, galvanized steel, copper tubing and other plastic piping; electricians may use EMT conduit, rigid conduit, PVC conduit and galvanized steel conduit; and irrigation contractors may use PVC, copper tubing, galvanized steel or polyethylene (PE) pipe. Each type of pipe of conduit has its own sets of dimensions. Measuring the actual outside diameter will not provide information as to the nominal sizes of the pipe involved. Like the use of the string to measure the actual outside diameter, the user then had to go to charts to determine the size of the pipe and any fittings needed.

OBJECTS

The present invention avoids these drawbacks and has for one of its objects the provision of an improved measuring tool for quickly determining the identity and size of a pipe by measuring the nominal diameter, including pipe already installed in awkward, limited access space. Another object of the present invention is the provision of an improved measuring tool for measuring the thickness of a pipe.

Another object of the present invention is the provision of an improved measuring tool which allows the user to easily determine the size and type of an installed pipe without exposing the entire circumference of a pipe.

Another object of the present invention is the provision of an improved measuring and identifying tool which allows the user to easily determine the size of a pipe even if the pipe is in an out of the way place, such as inside a building or inside a deep trench or ditch, such as in an irrigation system, where the pipe is installed in the ground.

Another object of the present invention is the provision of an improved measuring tool which is light and easily handled manually and does not require reference to charts or tables.

Other and further objects of the invention will be obvious upon an understanding of the illustrative embodiment about to be described, or will be indicated in the. appended claims and various advantages not referred to herein will occur to one skilled in the are,.upon employment of the invention in practice.

BRIEF DESCRIPTION

The present invention comprises a light-weight tool comprising a plurality of gauges which may be made of a rigid material, such as metal, wood, plastic, card-board or other light-weight material. Each gauge has an open curved configuration or open mouth at its front end. A plurality of these gauges, in overlying relation, are pivotally mounted together at the rear ends so that they may be folded into a compact tool or opened when in use. The curved open mouths on the different gauges are of different generally semi-circular sizes and extend substantially across the width of that end with the sizes of the pipe preferably marked on each gauge. Frequently, the opposite ends of the mouth are generally-narrow and pointed to aid in measuring in limited space locations of installed pipes, including irrigation pipe in the ground. The same "size" of pipes or conduits made from different materials have different outer diameters and different inner diameters. For example: a designated one-half (½) inch diameter pipe made of PVC has an outer diameter (O.D.) of 0.840 inches and an inside diameter (I.D.) of 0.546 inches with a wall thickness of 1.47 inches; a one-half (½) inch diameter copper water tube has an O.D. of 0.625 inches and an I.D. of 0.527 inches. Applicant's device allows the user to quickly identify the type of pipe and its size by measuring the nominal diameter of the pipe.

In use, the curved open mouth of a particular gauge is applied to the outside of a pipe to determine its circumferential and nominal diametrical size. Since the present invention provides a tool which has the curved open mouths of the various gauges scaled to standard sizes, one need merely fit the proper gauge onto the outside of a pipe to determine the pipe size of pipe as marked on the gauge.

Wall thickness notches may also be provided on at least some of the gauges which are scaled to standard pipe thicknesses. The notches are preferably marked to indicate pipe thickness. Hence, the user need merely apply a corresponding notch onto the wall of the pipe to ascertain its thickness.

The elongated tapered length of such gauge allows the user to readily handle the gauge in limited space locations.

In this manner, the measuring tool of the present invention saves time and effort and creates an inexpensive and convenient tool for accurately measuring the circumferential sizes and diametrical size of a pipe and for ascertaining the thickness of a pipe wall, even in installed pipe in difficult to access locations.

DRAWINGS

A preferred embodiment of the invention has been chosen for purposes of illustration and description and is shown in the accompanying drawings forming a part of the specification, wherein.

DESCRIPTION

Figure 1:
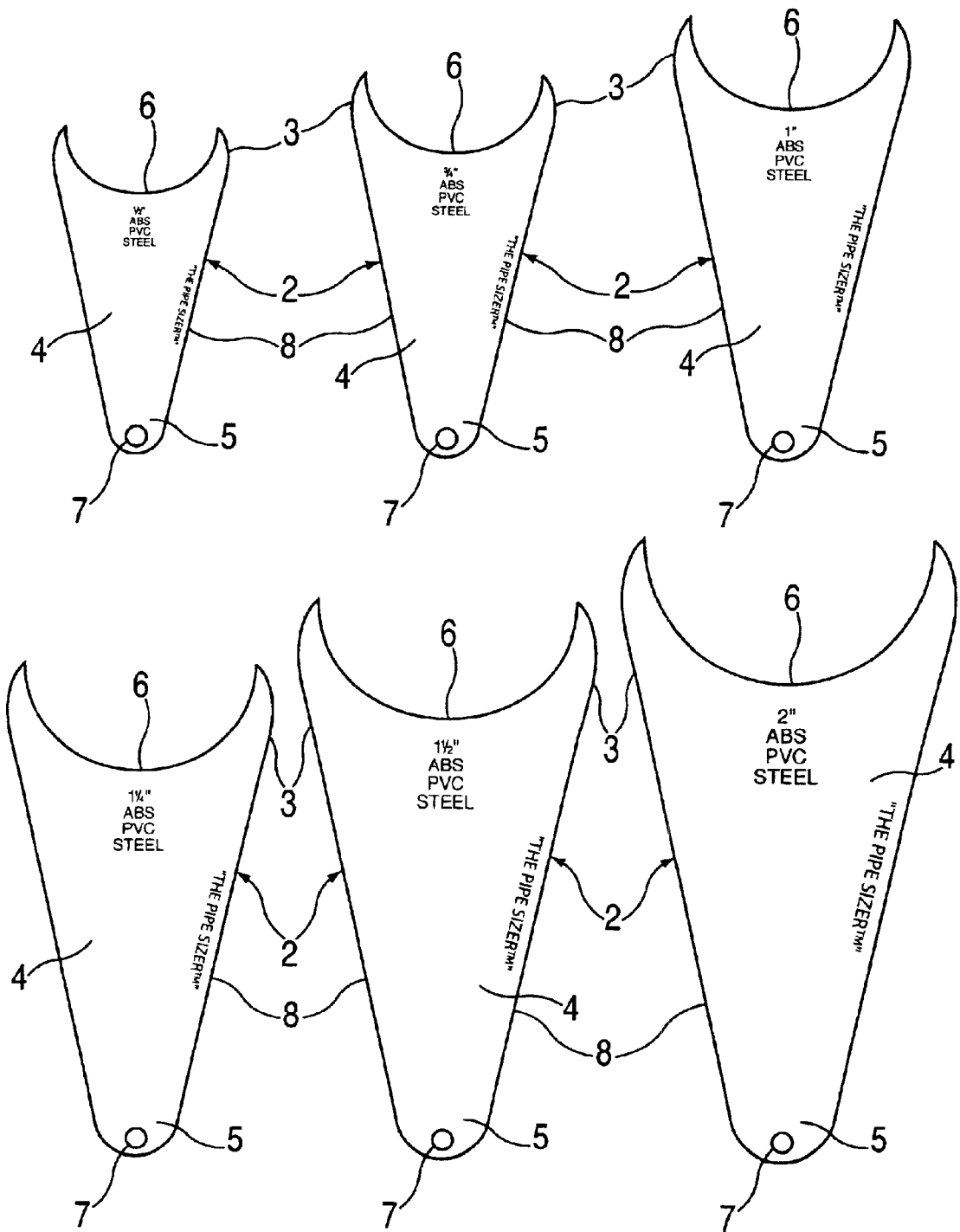
FIG. 1 is a plan view showing a number of gauges to be assembled together in accordance with the present invention.

The measuring tool 1 of the present invention (FIG. 4) comprises a plurality of flat, generally elongated, gauges 2 which may be made of metal, wood, plastic, cardboard or some other suitable material. The gauges 2 are preferably light-weight and rigid. Each gauge 2 has an enlarged or wide, front end head 3, a body portion 4 and a rear end 5. Preferably the body portion 4 of each gauge 2 has an intermediate portion with tapered side edges 8 connecting the wider front portion 3 with the narrower rear end 5. Such shape provides ease of handling by the user even when measuring installed pipe in cramped quarters. However, it will be understood that the gauges 2 may assume different shapes without departing from the invention.

Each front end 3 of each gauge 2 has a curved open mouth 6 formed therein which may be substantially semicircular as shown in the drawings. The mouth 6 extends across substantially the entire width of the. front end providing narrow ends of the front end head 3. The narrow ends at opposite sides of mouth 6 have generally pointed tips. The rear end 5 of each gauge 2 has an opening 7 therein which permits a plurality of such gauges 2 to be pivotally mounted together in overlapping, abutting position, as by a nut or rivet 10.

Figure 3:
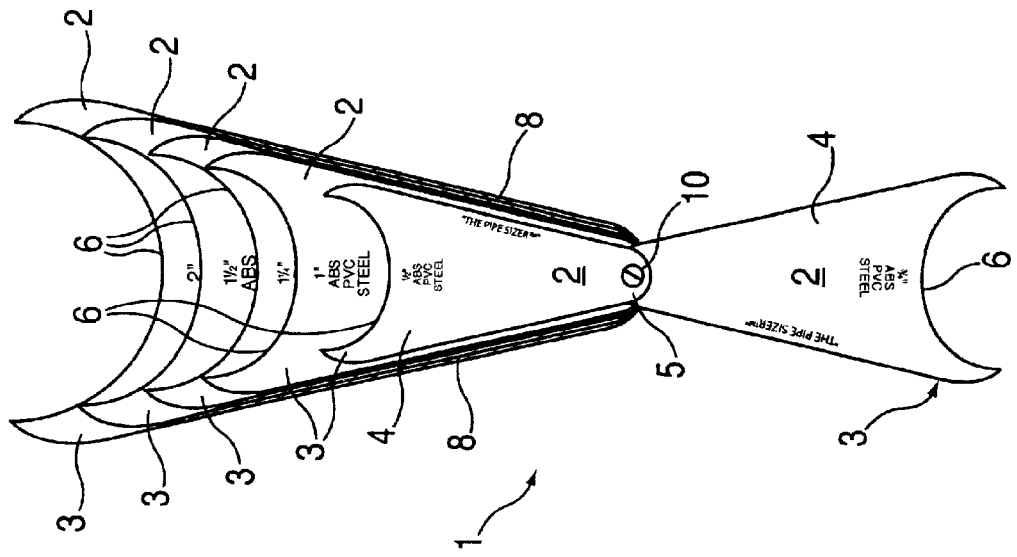
FIG. 3 is a plan view similar to FIG. 2 showing the manner of using the measuring tool of the present invention.
Figure 2:
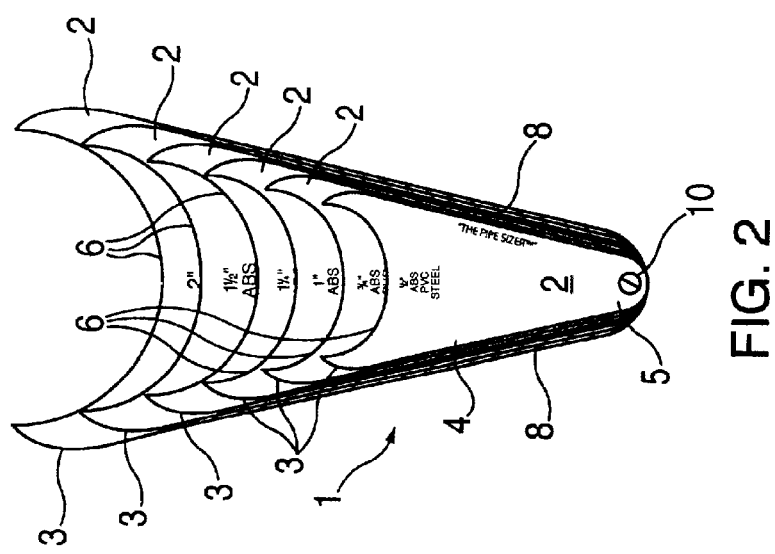
FIG. 2 is a plan view of the gauges of FIG. 1 assembled together.
Figure 4:
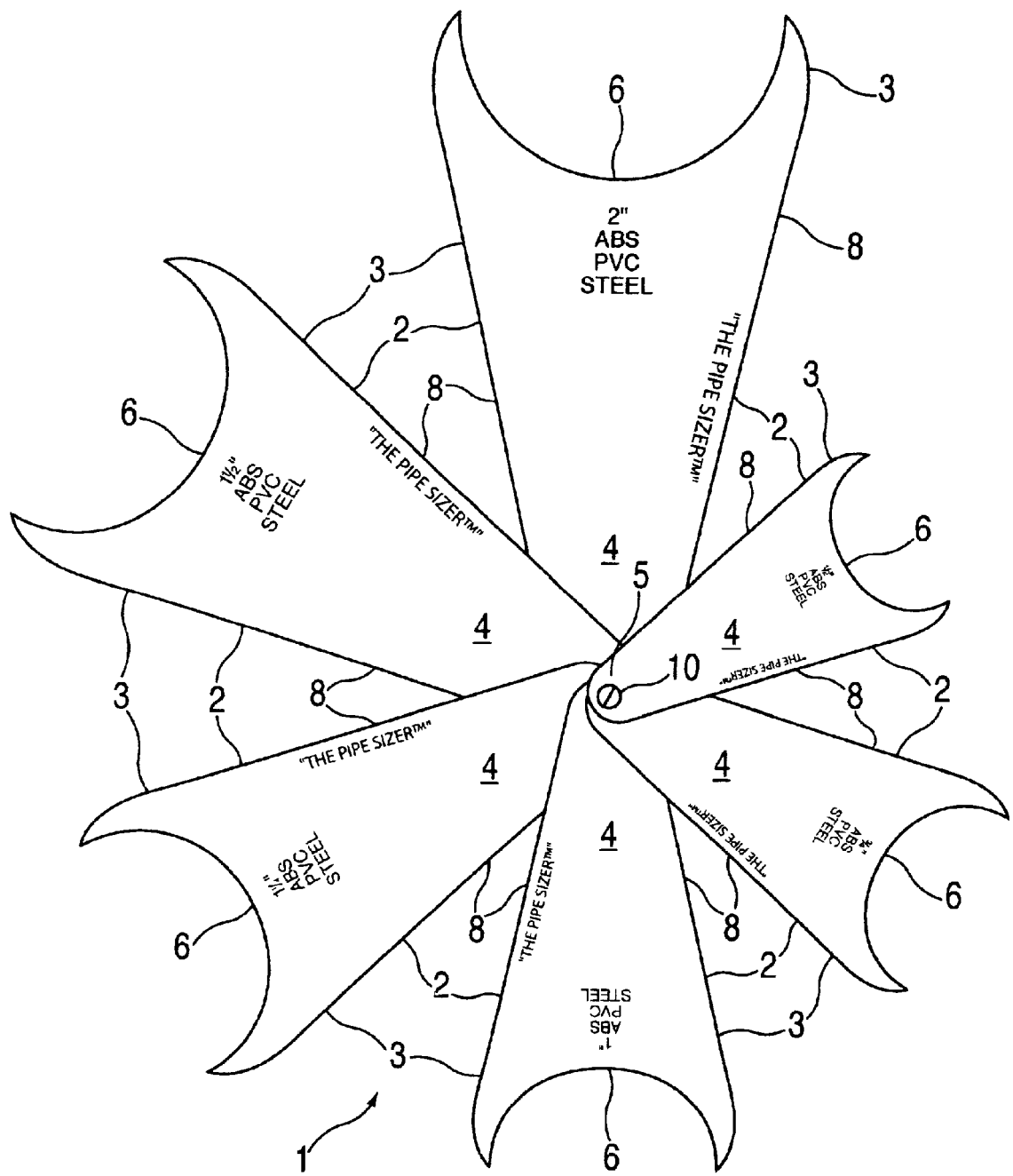
FIG. 4 is a plan view showing all the gauges in the open position.

The plurality of gauges 2 are of different lengths and sizes ranging from the shortest and smallest to the longest and largest. Each gauge 2 of a different size has a curved open mouth 6 of a different size. As shown in the drawing, the smallest curved open mouth 6 is in the smaller gauge 2 and the curved open mouths 6 become gradually larger for each larger gauge 2 until the largest curved open mouth 6 is in the largest gauge 2. Each gauge 2 is preferably marked with a particular nominal outer diameter of the pipe that fits the curved open mouth 6 therein. The several gauges 2 may be attached together by a rivet or screw 10 in the openings 7 as shown in FIG. 4 so that they pivot relative to each other from a folded compact position as seen in FIG. 2 to an open position illustrated in FIGS. 3 and 4. When in the folded position shown in FIG. 2 the tool is small enough to fit in the user's pocket or tool case. When opened (FIG. 3) the tool is still small enough to be easily manually handled, helped by reason of the tapered elongated body portion 4. As seen best in FIG. 3, the body portion 4 of the gauge 2 being used plus the body portions 4 of the folded gauges 2 not being used, help the user to manipulate gauge 2 even in tight inaccessible places.

Figure 6:
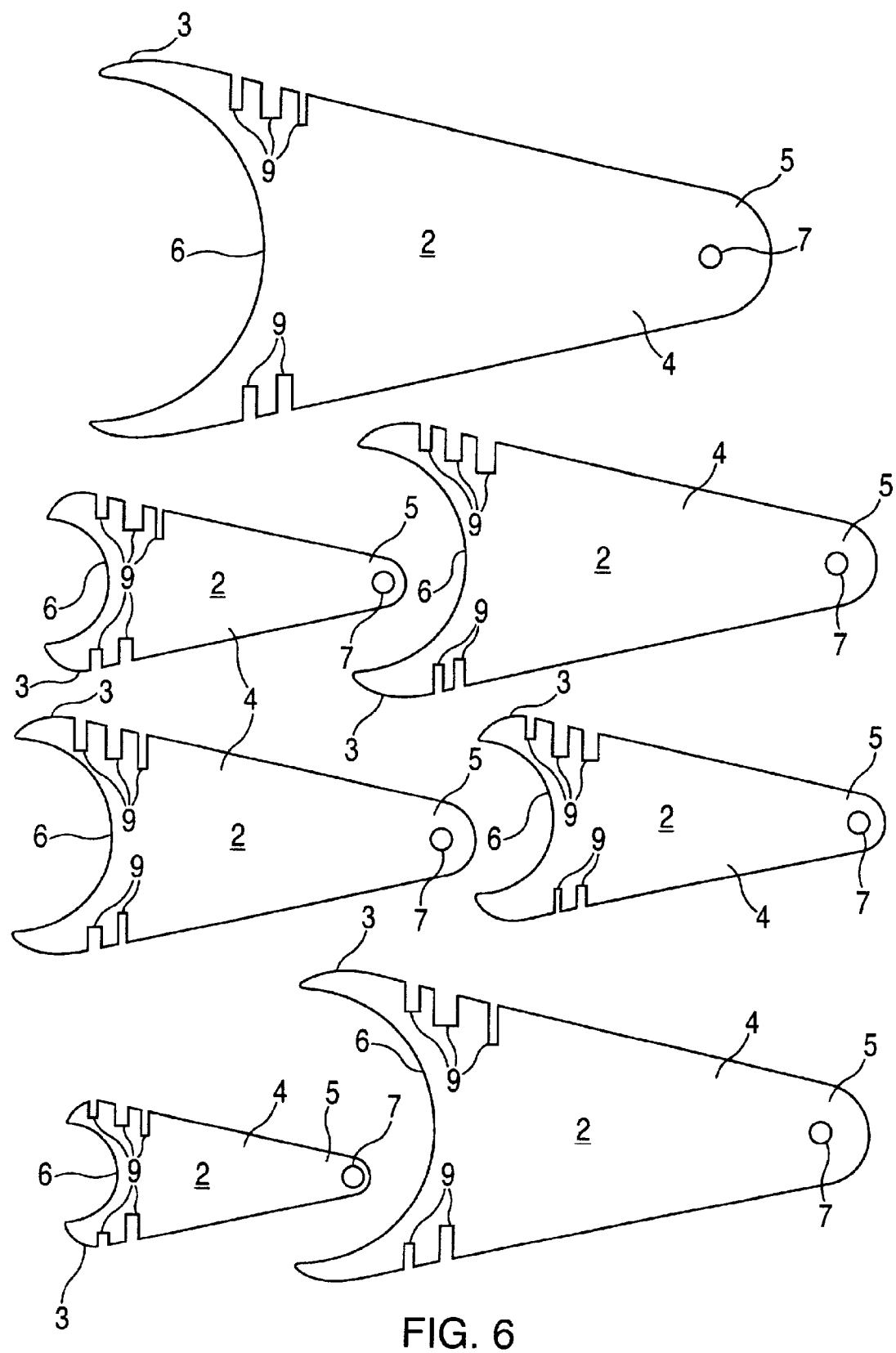
FIG. 6 is a plan view showing a modification of the present invention.

Referring to FIG. 6, the tool of the present invention may include pipe thickness identifier means. These comprise providing the side edges 8 of the gauges 2 with notches 9 on them which match standard thicknesses of pipes. These notches 9 may be marked Qor,.easy identification. The notches 9 may be located on each side of edge 8 of a gauge 2, or on one side edge only, as may be desired. It will be noted that the notches 9 are preferably close to the wider front end 3 of each gauge 2 as shown in the drawings. The notches 9 are used to measure the wall thickness for each Schedule and Class of pipe. For example, one size of PVC pipe can be manufactured with several different wall thicknesses (Outside Diameter minus Inside Diameter=Wall Thickness), such as Schedule 80, Schedule 40, Class 315, Class 200, Class 160 and Class 125. With the end of a pipe exposed, the tool of the present invention can determine the Schedule, Class, etc. of a pipe by placing and matching a notch 9 of a gauge 2 onto a pipe end to determine its thickness and identify the pipe size.

The measuring tool of the present invention can also provide an electronic readout mode (not shown). The measuring tool can be wired and battery-powered to be read as a Light Emitting Diode (LED) indicator using numbers of dots or it may be read as Liquid Crystal Display (LCD) indicator which will give correct sizes. This electronic version of the tool may be attached by a plug-in jack to an independent measuring unit such as a calculator or similar device.

Figure 5:
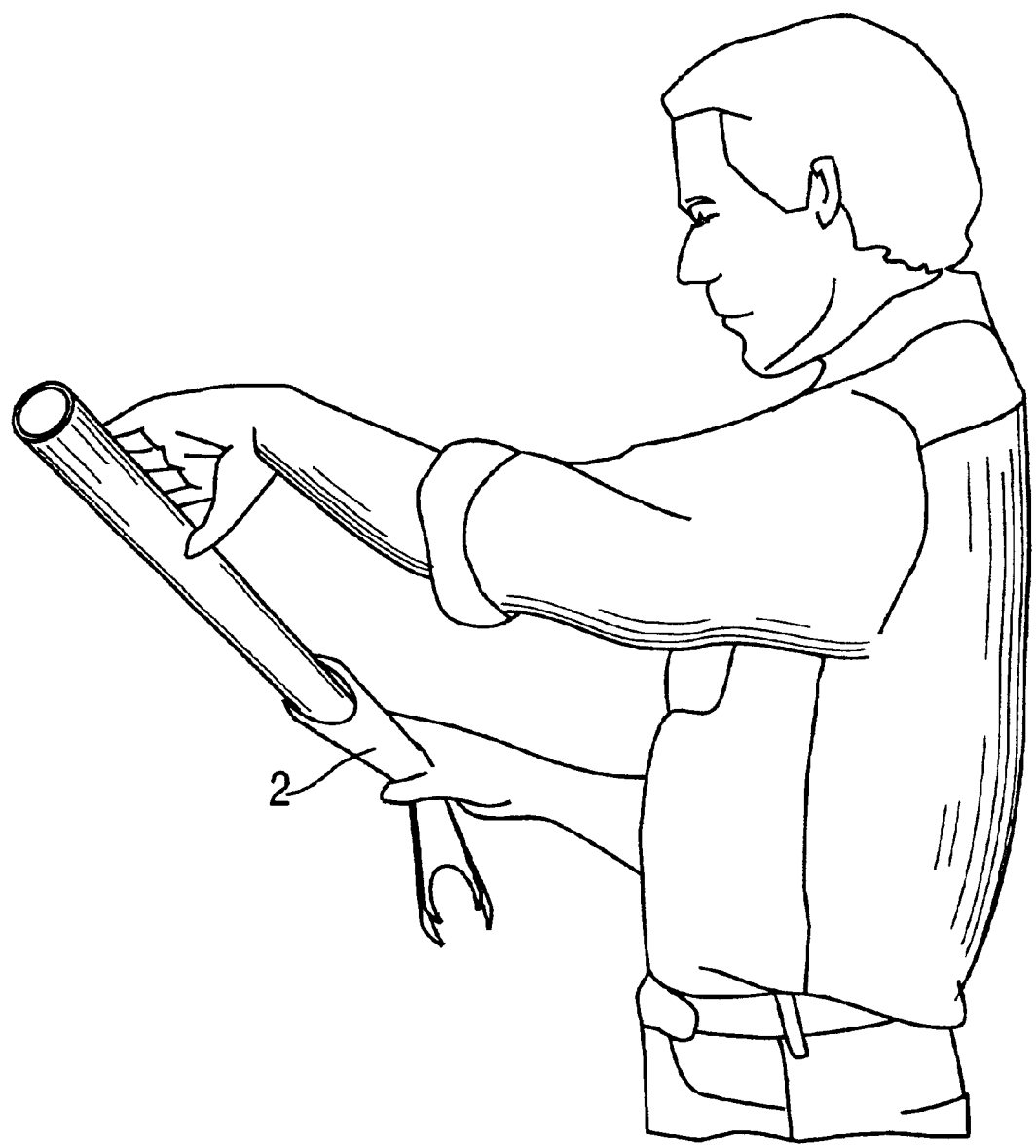
FIG. 5 is a plan view showing the tool in use.

In use, the measuring tool 1 of the present invention may be carried in the pocket or in a tool chest in the compact folded condition shown in Fig.2. When the size of a pipe is to be measured, as shown in FIG. 5, one of the gauges 2 is pivoted away from the rest of the gauges 2 (FIG. 5) and is applied to the pipe to determine its size. If that particular gauge 2 does not fit along the semicircle, then it is an easy matter for the user to pick another gauge 2 and try each one until the fit shows the right size gauge 2 is found. The size on that gauge identifies the pipe without further checking of tables and charts.

The measuring tool 1 may be made in several configurations to accommodate virtually all conduit, pipe and tubing diameters. If a gauge 2 of the tool is the correct size for the pipe being measured, the curved open mouth 6 will fit snugly on the curvature of this pipe with no excess surface on top or bottom. Similarly, to measure the thickness of a pipe it is merely necessary to place the notches 9 on the edges 8 of the gauge 2 to the pipe end until the proper thickness is determined by a matching fit.

As set forth herein, the word "pipe" may mean a water, gas, chemical, etc. pipe and tubing, and all electrical and telecommunications conduits. The pipe may be made from such material as copper, brass, steel, glass, asbestos cement, cast iron and plastics of all types such as PVC, ABS, PE, etc. The tool is especially suited to measure the size of installed pipes of an irrigation system. The narrow pointed ends of the front end head 3 allow measuring pipe still embedded in dirt. The term "size" is not meant to be the actual or true diameter of the pipe measured, but the "nominal" size of the pipe being measured.

It will thus be seen that the present invention provides an improved measuring tool for quickly and easily determining the outer diameter of a pipe and for measuring the thickness of a pipe, which is light weight and easily handled manually. The tool can rapidly identify the size of virtually any type of pipe, conduit, or tubing and the Schedule or Class of any type of pipe, conduit, or tubing as well. All sizes of pipe, conduit or tubing can be measured. In addition, all relevant pipe information such as pipe size, wall thickness, inside diameter, etc. may be labeled, stamped, or imprinted onto the various gauges of the tool.

As many and varied modifications of the subject matter of this invention will become apparent to those skilled in the art from the detailed description given hereinabove, it will be understood that the present invention is limited only as provided in the claims appended hereto.

What is claimed is:

1. A method for identifying the size of pipe installed in the ground by a hand-held pipe size gauge, having a front end portion with pointed tips, comprising the steps of:

a) locating the pipe in the ground,
b) pushing the pointed tips of the front end portion of said gauge into the ground overlying the pipe, generally 90 degrees perpendicular to the pipe,
c) providing an open and generally semicircular inwardly curved mouth of said gauge to determine a snug fit of said open mouth to the diameter of said pipe,
d) repeating step b with gauges having different size front-end portions and mouths, until said snug fit between the mouth of the gauge and the curvature of the pipe is obtained, and reading the size of the pipe from the gauge.

* * * * *